(12) United States Patent
Meyers et al.

(10) Patent No.: US 11,692,570 B2
(45) Date of Patent: Jul. 4, 2023

(54) PIN AND GROMMET FASTENER ACCOMMODATING TWO DIRECTIONAL OFFSET AND RELATED METHODS

(71) Applicant: Newfrey LLC, New Britain, CT (US)

(72) Inventors: Jason A. Meyers, Shelby Township, MI (US); Matthew R. Polselli, Macomb Township, MI (US)

(73) Assignee: Newfrey LLC, New Britain, CT (US)

( * ) Notice: Subject to any disclaimer, the term of this patent is extended or adjusted under 35 U.S.C. 154(b) by 485 days.

(21) Appl. No.: 17/002,891

(22) Filed: Aug. 26, 2020

(65) Prior Publication Data
US 2020/0386253 A1 Dec. 10, 2020

Related U.S. Application Data

(60) Continuation-in-part of application No. 16/935,928, filed on Jul. 22, 2020, now Pat. No. 11,549,533, (Continued)

(51) Int. Cl.
*F16B 5/06* (2006.01)
*B60R 13/02* (2006.01)
(Continued)

(52) U.S. Cl.
CPC .......... *F16B 5/0657* (2013.01); *B23P 19/02* (2013.01); *B60R 13/0206* (2013.01);
(Continued)

(58) Field of Classification Search
CPC .......... F16B 5/06; F16B 5/0628; F16B 5/065; F16B 5/0657; F16B 5/126; F16B 21/075; B23P 19/02; B60R 13/0206
(Continued)

(56) References Cited

U.S. PATENT DOCUMENTS 2,228,176 A 1/1941 Miller
3,469,493 A 9/1969 Fisher
(Continued)

FOREIGN PATENT DOCUMENTS

CN 1526962 A 9/2004
CN 101163894 A 4/2008
(Continued)

OTHER PUBLICATIONS

U.S. Appl. No. 16/935,928, filed Jul. 22, 2020, Meyers, et al.
(Continued)

*Primary Examiner* — Roberta S Delisle
(74) *Attorney, Agent, or Firm* — Harness, Dickey & Pierce, P.L.C.

(57) ABSTRACT

An inner housing defines a pin retaining receptacle elongated in an X-direction with entry ramps extending parallel to the X-direction. The inner housing is slidably coupled to an outer housing and extends into an interior thereof. Centering protrusions of one housing can engage the other housing to initially retain the pin retaining receptacle of the inner housing in a central position within the interior of the outer housing in the Y-direction prior to insertion of the pin into the pin retaining receptacle. The other housing can be movable against the centering protrusion to permit the pin retaining receptacle of the inner housing to move out of the central position in the Y-direction in response to engagement of the pin against the entry ramps during insertion of the pin into the pin retaining receptacle.

20 Claims, 17 Drawing Sheets

Related U.S. Application Data which is a continuation of application No. 16/371,921, filed on Apr. 1, 2019, now Pat. No. 10,788,068, which is a division of application No. 15/344,155, filed on Nov. 4, 2016, now Pat. No. 10,288,098.

(51) Int. Cl.
   *B23P 19/02* (2006.01)
   *F16B 21/07* (2006.01)
   *F16B 5/12* (2006.01)

(52) U.S. Cl.
   CPC ............ *F16B 5/0628* (2013.01); *F16B 5/126* (2013.01); *F16B 21/075* (2013.01); *F16B 5/06* (2013.01); *F16B 5/065* (2013.01); *Y10T 29/49876* (2015.01); *Y10T 29/49893* (2015.01)

(58) Field of Classification Search
   USPC .................................................. 411/508–510
   See application file for complete search history.

(56) References Cited

U.S. PATENT DOCUMENTS

| | | |
|---|---|---|
| 4,002,821 A | 1/1977 | Satoh et al. |
| 4,043,579 A | 8/1977 | Meyer |
| 4,407,042 A | 10/1983 | Schramme et al. |
| 4,458,552 A | 7/1984 | Spease et al. |
| 4,594,040 A | 6/1986 | Molina |
| 4,626,620 A | 12/1986 | Plyler |
| 4,707,020 A | 11/1987 | Enokida et al. |
| 4,729,606 A | 3/1988 | Narita et al. |
| 4,768,907 A | 9/1988 | Gauron |
| 4,865,505 A | 9/1989 | Okada |
| 4,878,792 A | 11/1989 | Frano |
| 4,923,347 A | 5/1990 | Moryl et al. |
| 4,971,500 A | 11/1990 | Benoit et al. |
| 5,028,189 A | 7/1991 | Harley |
| 5,073,070 A | 12/1991 | Chang |
| 5,098,765 A | 3/1992 | Bien |
| 5,129,768 A | 7/1992 | Hoyle et al. |
| 5,387,065 A | 2/1995 | Sullivan |
| 5,429,467 A | 7/1995 | Gugle et al. |
| 5,484,175 A | 1/1996 | Teich et al. |
| 5,533,237 A | 7/1996 | Higgins |
| 5,536,125 A | 7/1996 | Gaw, Jr. |
| 5,542,158 A | 8/1996 | Gronau et al. |
| 5,606,784 A | 3/1997 | Hamamoto |
| 5,716,578 A | 2/1998 | Ichikawa et al. |
| 5,738,476 A | 4/1998 | Assimakopoulos |
| 5,806,139 A | 9/1998 | Anderson et al. |
| 5,890,831 A | 4/1999 | Kato |
| 6,048,147 A | 4/2000 | Arisaka et al. |
| 6,145,173 A | 11/2000 | Suzuki et al. |
| 6,196,756 B1 | 3/2001 | Leverger |
| 6,206,604 B1 | 3/2001 | Dembowsky et al. |
| 6,209,175 B1 | 4/2001 | Gershenson |
| 6,474,616 B2 | 11/2002 | Yamada et al. |
| 6,505,990 B1 | 1/2003 | Maughan |
| 6,530,714 B2 | 3/2003 | Schwarz |
| 6,553,615 B1 | 4/2003 | Hansen et al. |
| 6,560,819 B2 | 5/2003 | Mizuno et al. |
| 6,695,481 B1 | 2/2004 | Chen |
| 6,758,622 B2 | 7/2004 | Burton |
| 7,226,233 B2 | 6/2007 | SuBenbach et al. |
| 7,470,081 B2 | 12/2008 | Miyahara et al. |
| 7,740,432 B2 | 6/2010 | Harada |
| 7,861,384 B2 | 1/2011 | Baumgartner |
| 7,905,694 B2 | 3/2011 | van Walraven |
| 8,322,001 B2 | 12/2012 | Ehrhardt et al. |
| 8,613,414 B2 | 12/2013 | Rosemann et al. |
| 8,636,454 B2 | 1/2014 | Okada et al. |
| 8,950,043 B2 | 2/2015 | Hofmann et al. |
| 9,057,393 B1 | 6/2015 | Lawrence |
| 9,080,588 B2 | 7/2015 | Diez Herrera et al. |
| 9,140,294 B2 | 9/2015 | Burton |
| 9,150,120 B2 | 10/2015 | Antoine et al. |
| 9,303,665 B2 | 4/2016 | Steltz et al. |
| 9,550,441 B2 | 1/2017 | Aoyama et al. |
| 9,995,331 B2 | 6/2018 | Heimann et al. |
| 10,288,098 B2 | 5/2019 | Meyers et al. |
| 10,788,068 B2 | 9/2020 | Meyers et al. |
| 2002/0050551 A1 | 5/2002 | Yamada et al. |
| 2008/0056816 A1 | 3/2008 | Sussenbach |
| 2011/0219588 A1 | 9/2011 | Inoue |
| 2012/0131771 A1 | 5/2012 | Hofmann et al. |
| 2013/0014353 A1 | 1/2013 | Loewe et al. |
| 2014/0050548 A1 | 2/2014 | Loewe et al. |
| 2014/0053385 A1 | 2/2014 | Nielsen-Cole et al. |
| 2015/0211565 A1 | 7/2015 | Benedetti |
| 2015/0321622 A1 | 11/2015 | Dickinson et al. |
| 2016/0138646 A1 | 5/2016 | Elperman et al. |
| 2016/0258465 A1 | 9/2016 | Heimann et al. |
| 2018/0050610 A1 | 2/2018 | Hattori et al. |
| 2018/0209463 A1 | 7/2018 | Glickman et al. |
| 2019/0271339 A1 | 9/2019 | Benedetti |

FOREIGN PATENT DOCUMENTS

| | | |
|---|---|---|
| CN | 102187103 A | 9/2011 |
| CN | 105077859 A | 11/2015 |
| CN | 108019409 A | 5/2018 |
| EP | 0698741 A1 | 2/1996 |
| EP | 1375931 A1 | 1/2004 |
| EP | 3318770 A1 | 5/2018 |
| FR | 2554522 A1 | 5/1985 |
| FR | 2740183 A1 | 4/1997 |
| JP | S6434349 U | 3/1989 |
| JP | 2012087824 A | 5/2012 |
| JP | 2012167692 A | 9/2012 |
| JP | 2013238286 A | 11/2013 |

OTHER PUBLICATIONS

Office Action dated Jun. 21, 2022, in corresponding/related Chinese Application No. 201910835912.3.
Third Chinese Office Action regarding Application No. 201910835912.3, dated Sep. 21, 2022.
Extended European Search Report dated Mar. 13, 2018 in corresponding EP Patent Application No. 17196055.2.
Extended European Search Report dated Jan. 24, 2022 in corresponding EP Patent Application No. 21193131.4.

PIN AND GROMMET FASTENER ACCOMMODATING TWO DIRECTIONAL OFFSET AND RELATED METHODS

CROSS-REFERENCE TO RELATED APPLICATIONS

This application is a continuation-in-part of U.S. patent application Ser. No. 16/935,928 filed on Jul. 22, 2020, which is a continuation of U.S. patent application Ser. No. 16/371,921 filed on Apr. 1, 2019, which is a divisional of U.S. patent application Ser. No. 15/344,155 filed on Nov. 4, 2016 (now U.S. Pat. No. 10,288,098, issued May 14, 2019). The entire disclosures of the above applications are hereby incorporated herein by reference.

FIELD

The present disclosure relates to pin and grommet fasteners.

BACKGROUND

This section provides background information related to the present disclosure which is not necessarily prior art.

Pin and grommet fasteners are known in the art. Such pin and grommet fasteners typically require the pin to be centrally aligned in both X and Y directions with a pin receiving aperture of the grommet. In other words, a pin that is offset from the pin receiving aperture must be physically repositioned to align with the center of the pin receiving aperture of the grommet before the pin can be inserted into the pin receiving aperture. Some pin and grommet fasteners exist that allow for offset of the pin in one direction (e.g., in the X-direction), but the pin must still be repositioned relative to the grommet so the pin is centrally aligned with the pin receiving aperture in the other direction (e.g., in the Y-direction) to effect its insertion.

Such pin and grommet fasteners are not completely satisfactory, for example, where a plurality of pins are attached to a first component in fixed positions relative to each other and need to be inserted into pin receiving apertures of a corresponding plurality of grommets fixed to another component. As another example, such pin and grommet fasteners are not completely satisfactory where insertion of the pin into the grommet involves blind positioning and insertion of the pin in the grommet. Ease of pin insertion in both of these cases would be facilitated by a pin and grommet fastener that can accommodate a significant amount of pin offset in both the X and Y directions during insertion into the pin retaining aperture of the grommet.

SUMMARY

This section provides a general summary of the disclosure, and is not a comprehensive disclosure of its full scope or all of its features.

In accordance with one aspect of the present disclosure, a pin and grommet fastener for mounting in an aperture of a first component and receiving a pin extending from a second component to couple the first and second components together is provided. The pin and grommet fastener can include a pin having a pin retention groove or protrusion. The grommet can include an inner housing defining a pin retaining receptacle elongated in an X-direction with entry ramps extending parallel to the X-direction, a cooperating pin retention groove or protrusion operable to retain the pin retention groove or protrusion, and an inner housing flange having an inner housing retaining surface. The grommet can include an outer housing defining an interior with an outer housing flange having a cooperating inner housing retaining surface, and a plurality of resilient retention wings positioned to retain the first component with the outer housing flange when the outer housing is mounted within the aperture of the first component. The grommet can include a centering protrusion provided on a first of the inner housing flange and the outer housing flange. The inner housing retaining surface can engage the cooperating inner housing retaining surface, with the pin retaining receptacle of the inner housing extending into the interior of the outer housing, to slidably couple the inner housing and the outer housing together while permitting movement of the inner housing relative to the outer housing in a Y-direction between a central position and a non-central position. The centering protrusion can engage a second of the inner housing flange and the outer housing flange to initially retain the pin retaining receptacle of the inner housing in the central position within the interior of the outer housing in the Y-direction prior to insertion of the pin into the pin retaining receptacle. The second of the inner housing flange and the outer housing flange can be movable against the centering protrusion in the Y-direction to permit the pin retaining receptacle of the inner housing to move out of the central position to the non-central position relative to the interior of the outer housing in the Y-direction in response to engagement of the pin against the entry ramps during insertion of the pin into the pin retaining receptacle.

In accordance with another aspect of the present disclosure, a pin and grommet fastener for mounting in an aperture of a first component and receiving a pin extending from a second component to couple the first and second components together is provided. The pin and grommet fastener can include a pin having a pin retention groove or protrusion. The grommet can include an inner housing defining a pin retaining receptacle elongated in an X-direction with entry ramps extending parallel to the X-direction, a cooperating pin retention groove or protrusion operable to retain the pin retention groove or protrusion, and an inner housing flange having an inner housing retaining surface. The grommet can include an outer housing defining an interior with an outer housing flange having a cooperating inner housing retaining surface, and a plurality of resilient retention wings positioned to retain the first component with the outer housing flange when the outer housing is mounted within the aperture of the first component. The grommet can include a centering protrusion provided on a first of the inner housing and the outer housing. The inner housing retaining surface can engage the cooperating inner housing retaining surface, with the pin retaining receptacle of the inner housing extending into the interior of the outer housing, to slidably couple the inner housing and the outer housing together while permitting movement of the inner housing relative to the outer housing in a Y-direction between a central position and a non-central position. The centering protrusion can engage a second of the inner housing and the outer housing to initially retain the pin retaining receptacle of the inner housing in the central position within the interior of the outer housing in the Y-direction prior to insertion of the pin into the pin retaining receptacle. The second of the inner housing and the outer housing can be movable against the centering protrusion in the Y-direction to permit the pin retaining receptacle of the inner housing to move out of the central position to the non-central position relative to the interior of the outer housing in the Y-direction in response to engagement of the pin against the entry ramps during insertion of the pin into the pin retaining receptacle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
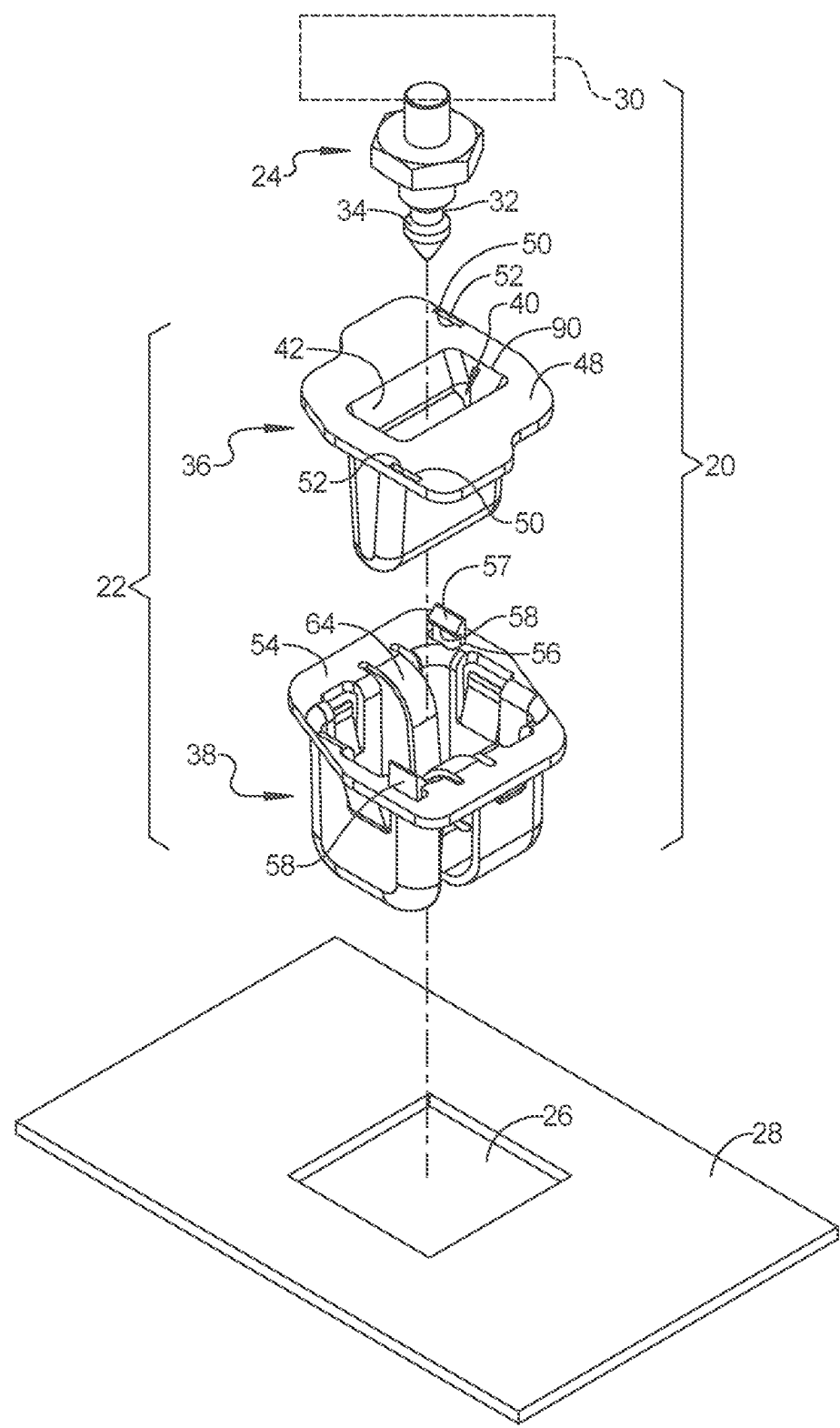
FIG. 1 is an exploded perspective view including a first example embodiment of a pin and grommet fastener in accordance with the present disclosure.
Figure 2:
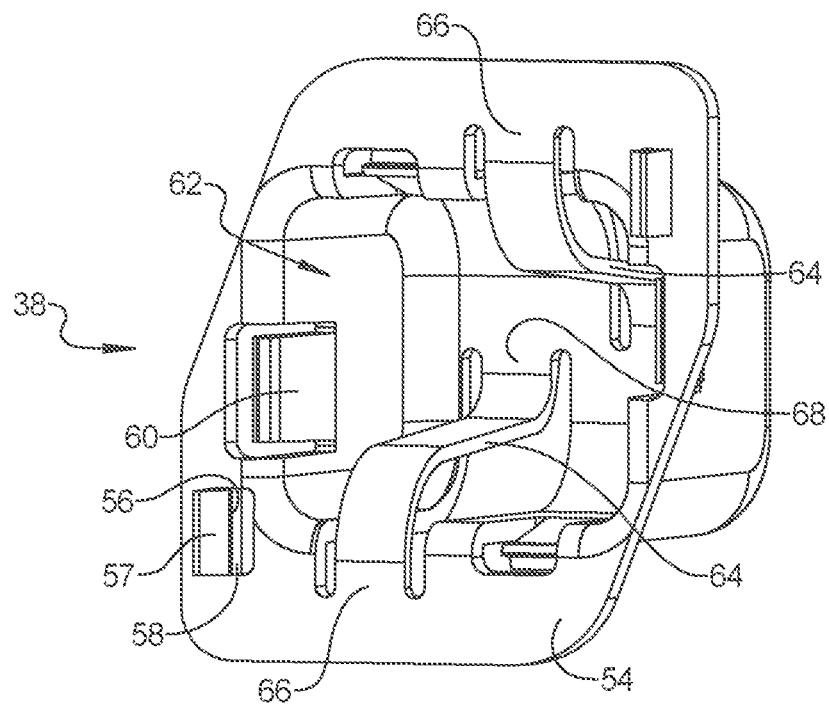
FIG. 2 is a perspective view of the outer housing of the first example pin and grommet fastener of FIG. 1.
Figure 3:
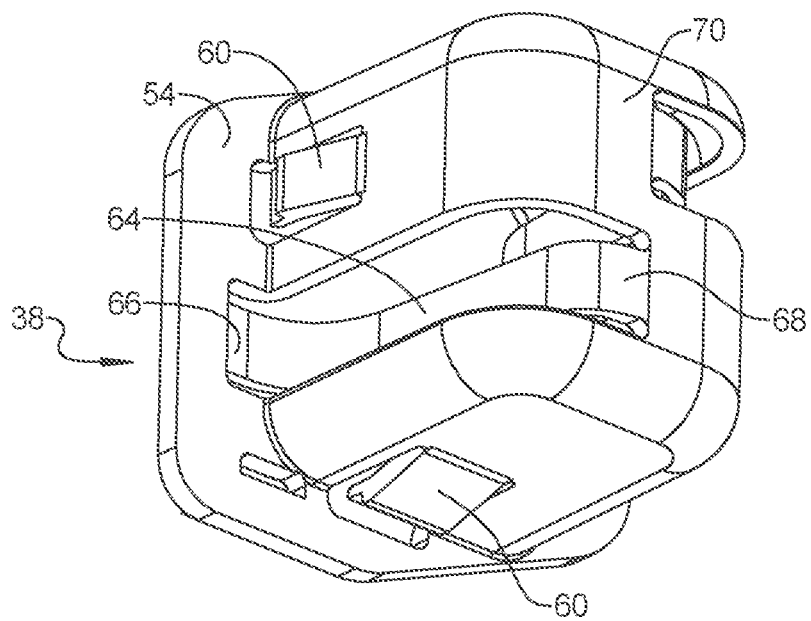
FIG. 3 is another perspective view of the outer housing of the first example pin and grommet fastener of FIG. 1.
Figure 4:
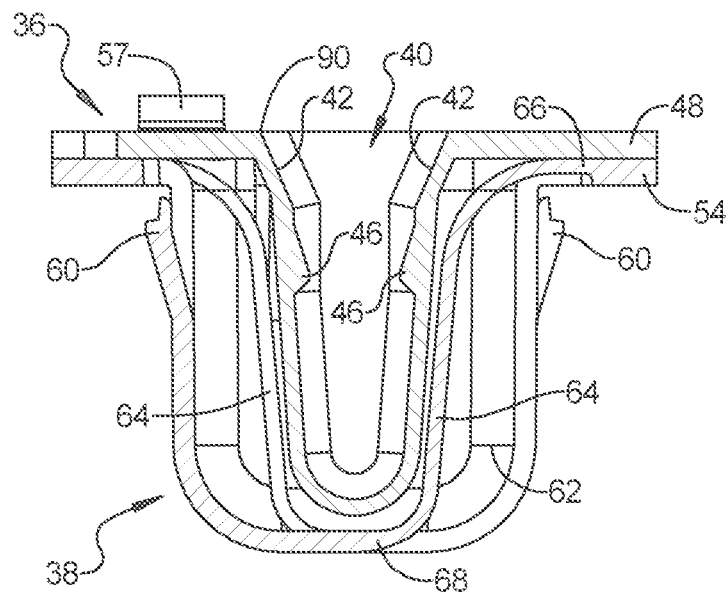
FIG. 4 is a cross-section view of the grommet of the first example pin and grommet fastener of FIG. 1, showing the inner housing in a central position.

Example embodiments will now be described more fully with reference to the accompanying drawings.

FIGS. 1-6 illustrate one example embodiment of a pin and grommet fastener 20 in accordance with the present disclosure. The grommet 22 is mountable in an aperture 26 of a first component 28 to receive the pin 24 extending from a second component 30 to couple the first and second components, 28 and 30, respectively, together. The pin 24 can include a retention groove 32. Additionally or alternatively, the pin 24 can include a retention protrusion 34.

The grommet 22 includes an inner housing 36 and an outer housing 38. The inner housing 36 defines a pin retaining receptacle 40 elongated in an X-direction. The pin retaining receptacle 40 can include entry ramps 42 extending parallel to the X-direction. A cooperating pin retention protrusion 46 is positioned to engage the pin retention groove 32 and retain the pin 24 in the pin retention receptacle 40. Alternatively or additionally, a cooperating pin retention groove can be positioned to engage the pin retention protrusion 34 and retain the pin 24 in the pin retention receptacle 40.

The inner housing 36 can include an inner housing flange 48 having an inner housing retaining surface 50. Two inner housing retaining surfaces 50 of this embodiment are provided by respective peripheral portions of slots 52 extending through the flange 48. The outer housing 38 can have an outer housing flange 54 having cooperating inner housing retaining surfaces 56. Two cooperating inner housing retaining surfaces 56 of this embodiment are provided by protrusions 57 extending from flexible posts 58 extending from the outer housing flange 54.

The outer housing 38 can have a plurality of resilient retention wings 60 positioned to retain the first component 28 against the lower surface of the outer housing flange 54 when the outer housing 38 is mounted within the aperture 26 of the first component 28.

The outer housing 38 defines an interior 62 and a plurality of centering blades 64 extend into the interior 62 between the outer housing 38 and the inner housing 36. The centering blades 64 are positioned and extend to locate the pin retaining receptacle 40 in a central position (FIG. 4) within the interior 62 of the outer housing 38 in a Y-direction prior to insertion of the pin 24 into the pin retention receptacle 40. The centering blades 64 can be flexible enough to move in the Y-direction to permit the pin retaining receptacle 40 to move to a non-central position (FIG. 5) relative to the outer housing 38 in the Y-direction as a result of the inner housing 36 flexing and moving the centering blades 64 during insertion of the pin 24 into the pin receiving receptacle 40.

Figure 5:
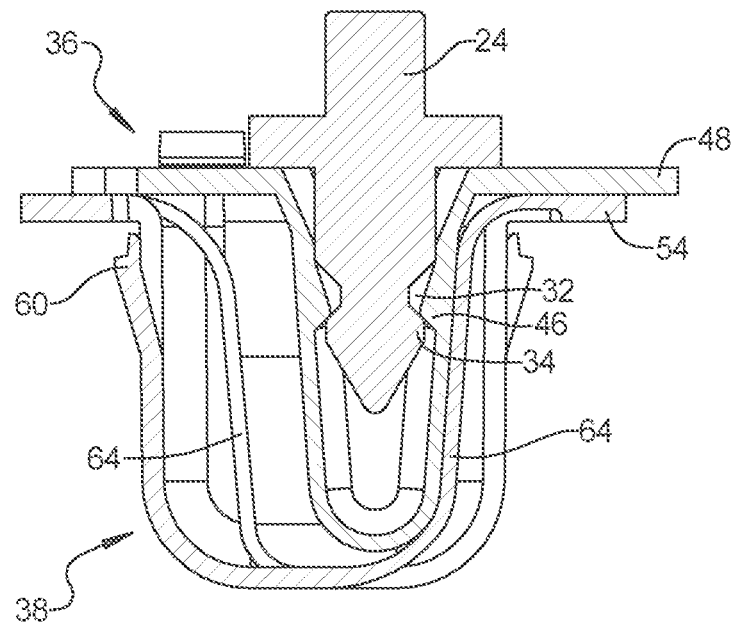
FIG. 5 is a cross-section view of the grommet of the first example pin and grommet fastener of FIG. 1, showing the inner housing in a non-central position.
Figure 6:
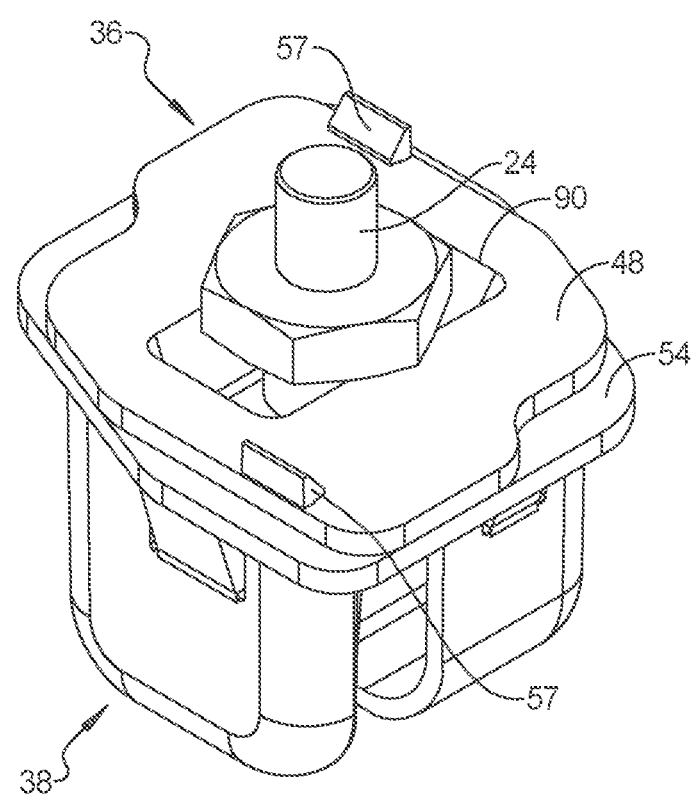
FIG. 6 is a perspective view of the first example pin and grommet fastener of FIG. 1.
Figure 7:
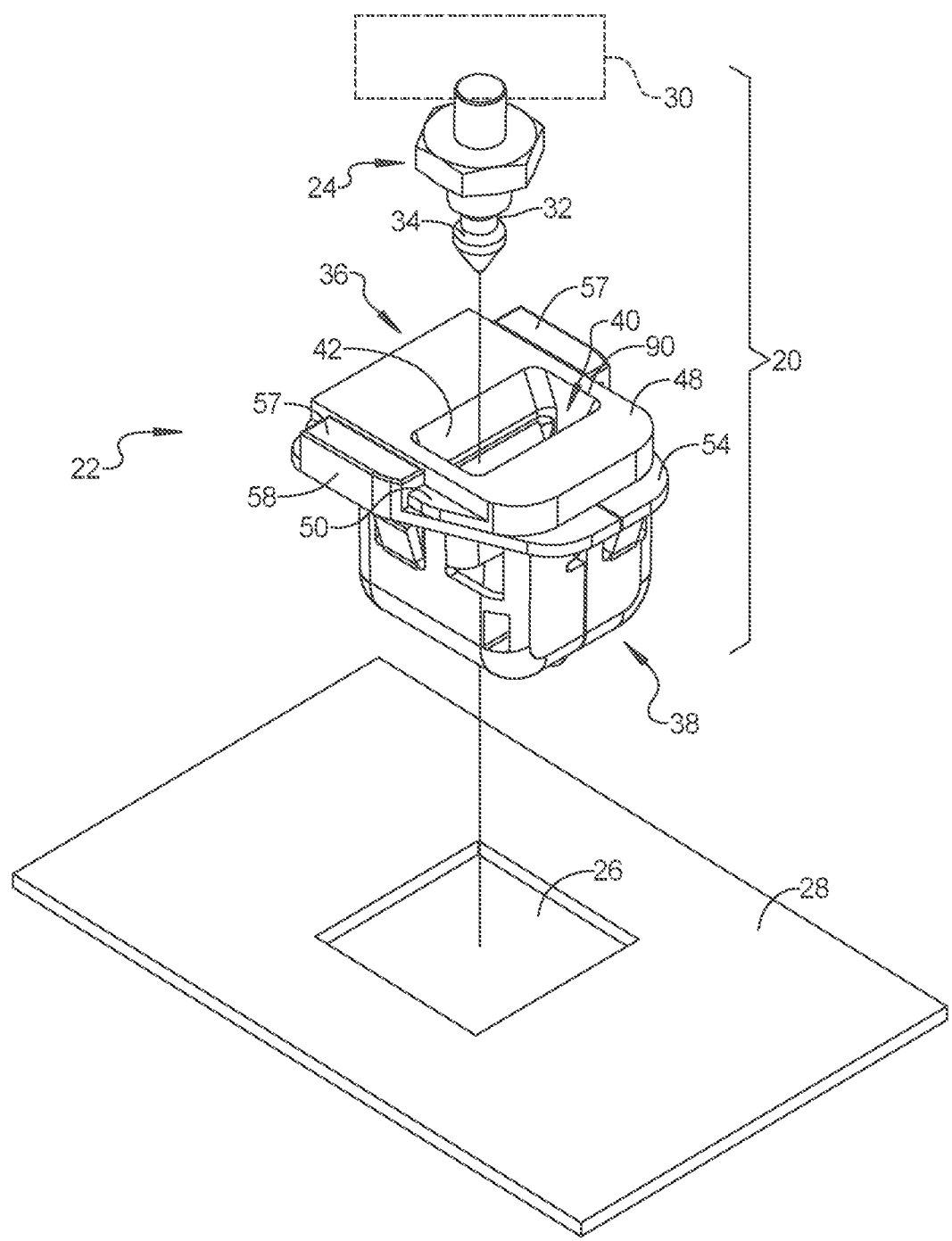
FIG. 7 is a partially exploded perspective view including a second example embodiment of a pin and grommet fastener in accordance with the present disclosure.
Figure 8:
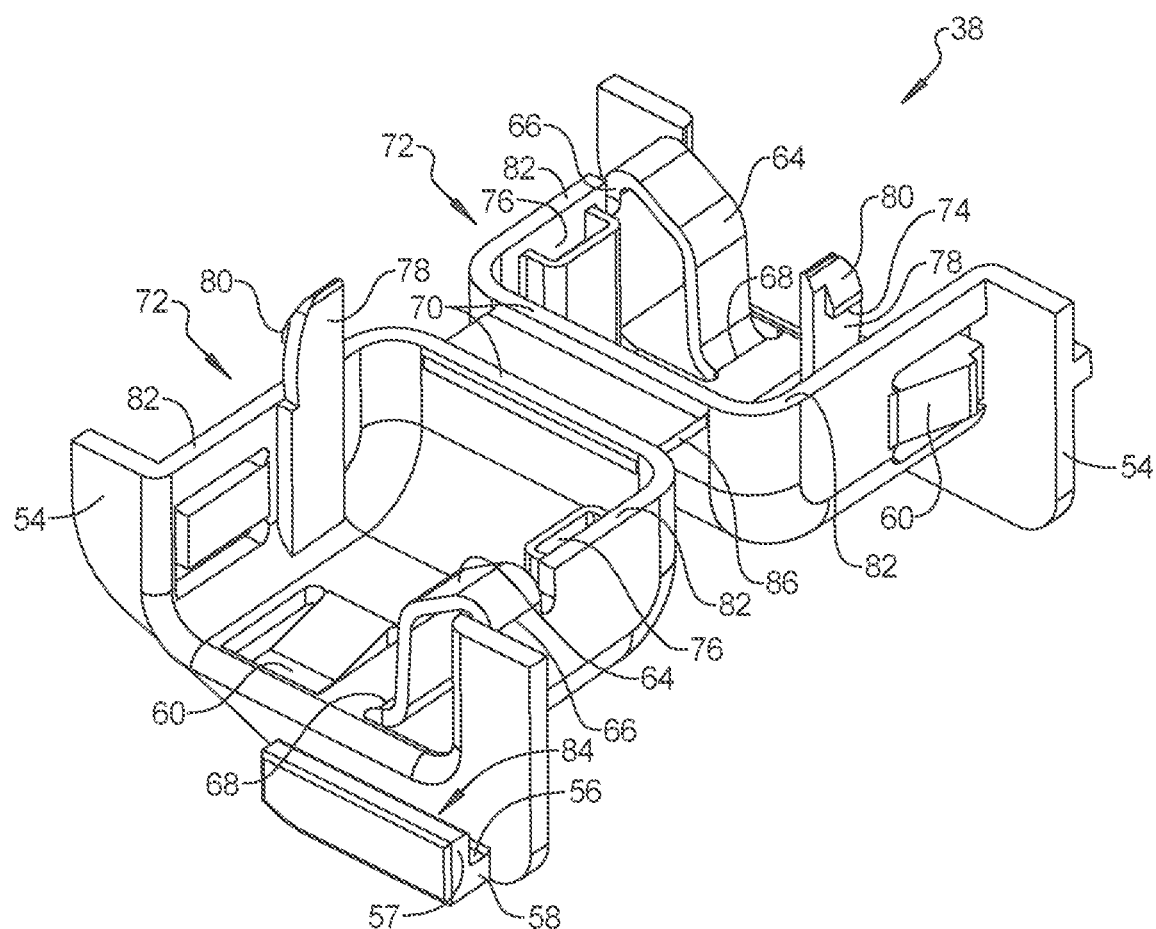
FIG. 8 is a perspective view of the outer housing of the second example pin and grommet fastener of FIG. 7.
Figure 9:
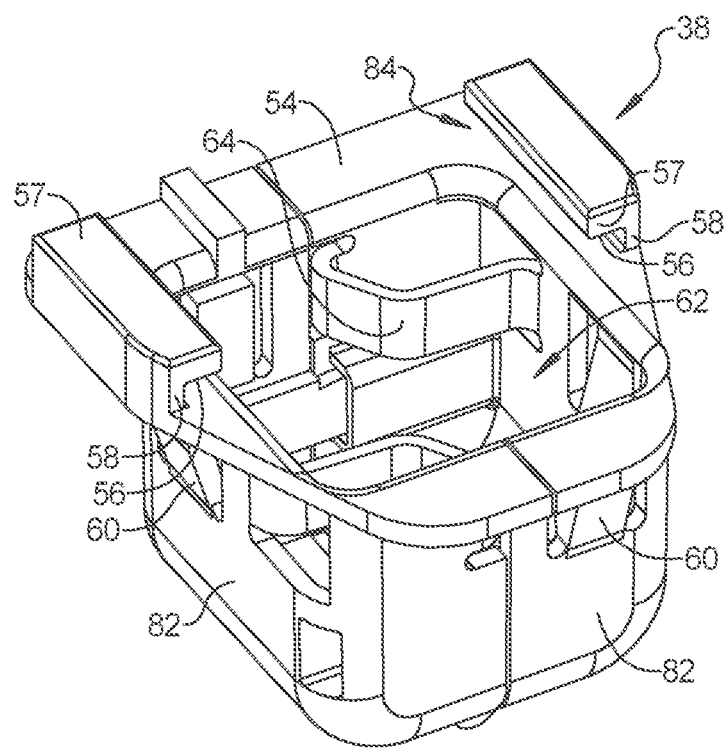
FIG. 9 is another perspective view of the outer housing of the second example pin and grommet fastener of FIG. 7.
Figure 10:
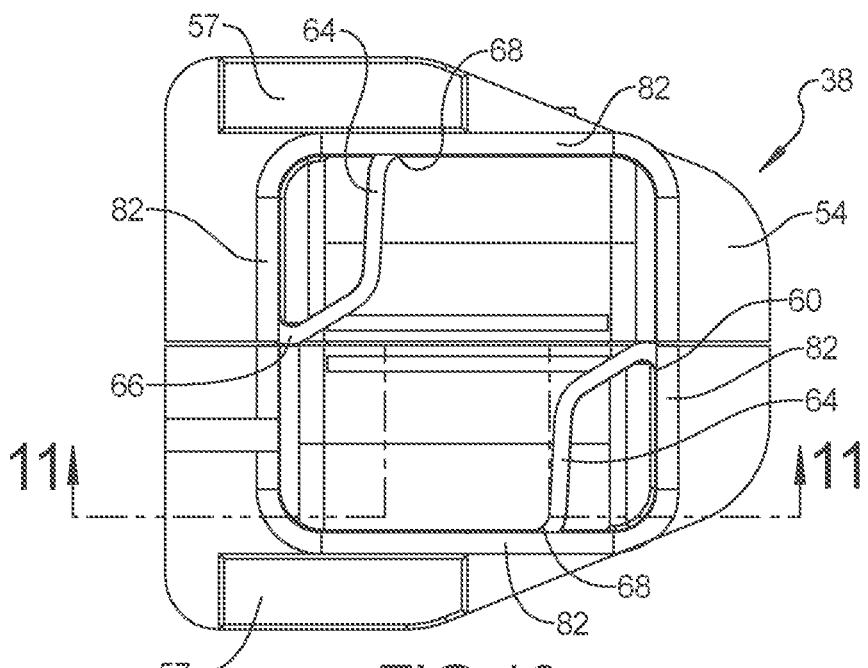
FIG. 10 is a top plan view of the outer housing of the second example pin and grommet fastener of FIG. 7.
Figure 11:
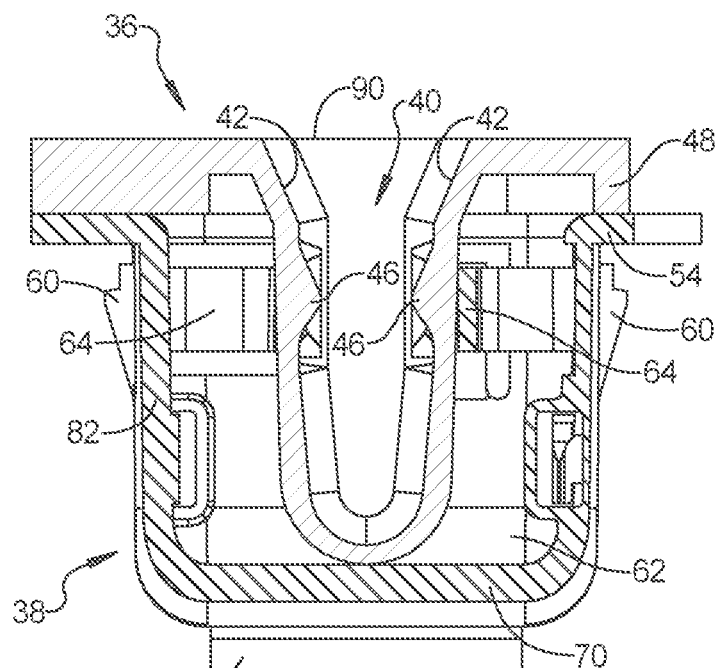
FIG. 11 is a cross-section view of the grommet of the second example pin and grommet fastener of FIG. 7, showing the inner housing in a central position.
Figure 12:
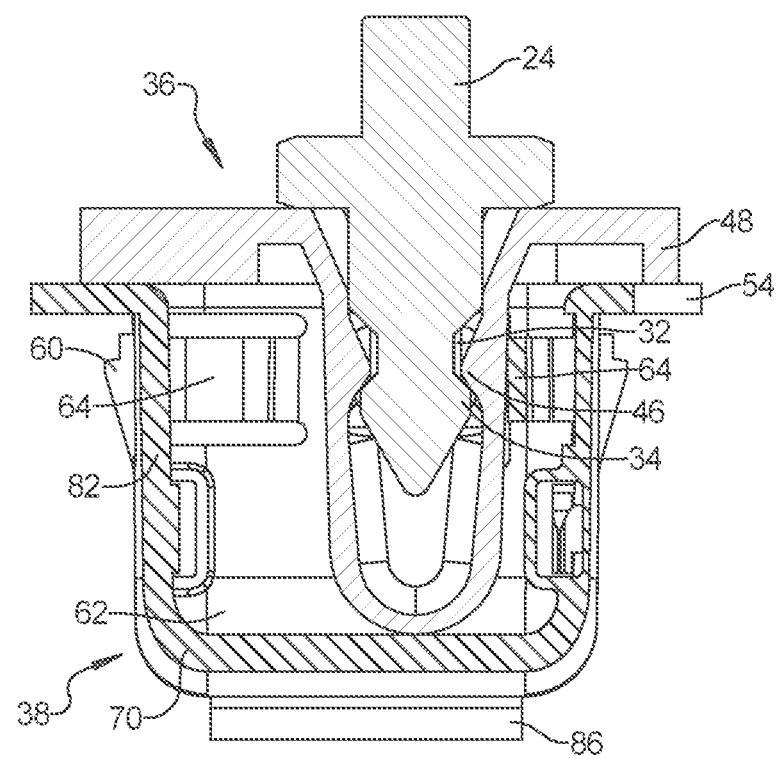
FIG. 12 is a cross-section view of the grommet of the second example pin and grommet fastener of FIG. 7, showing the inner housing in a non-central position.
Figure 13:
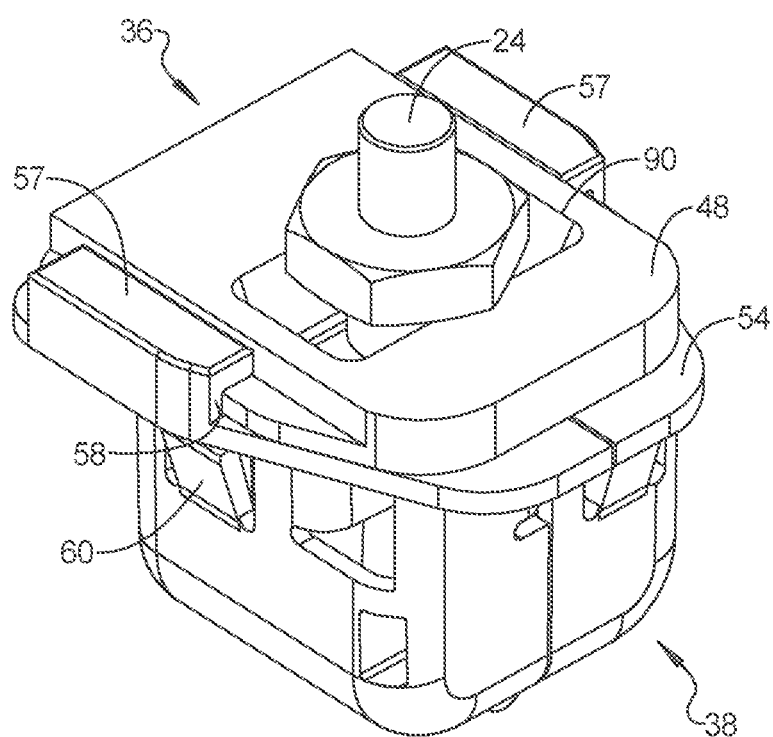
FIG. 13 is a perspective view of the second example pin and grommet fastener of FIG. 7.
Figure 14:
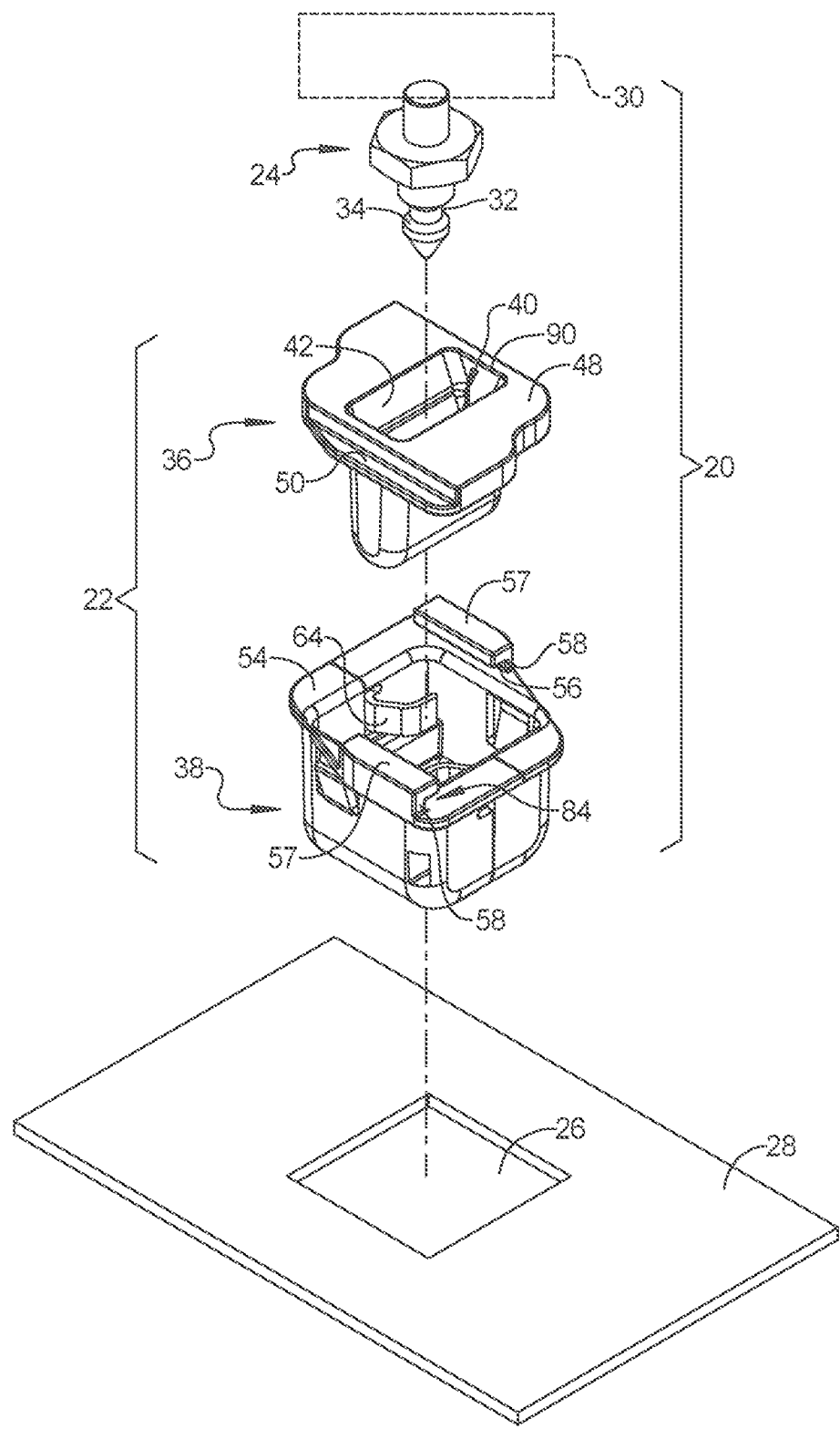
FIG. 14 is a partially exploded perspective view including a third example embodiment of a pin and grommet fastener in accordance with the present disclosure.
Figure 15:
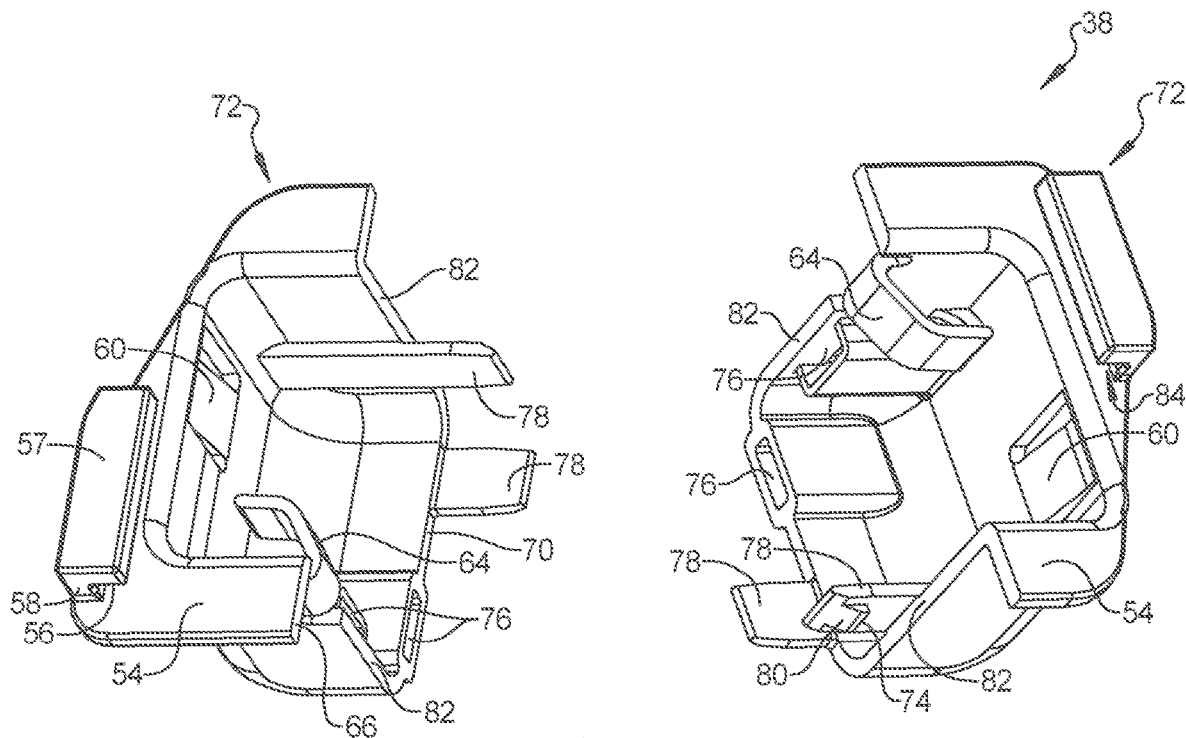
FIG. 15 is an exploded perspective view of the outer housing of the third example pin and grommet fastener of FIG. 14.
Figure 16:
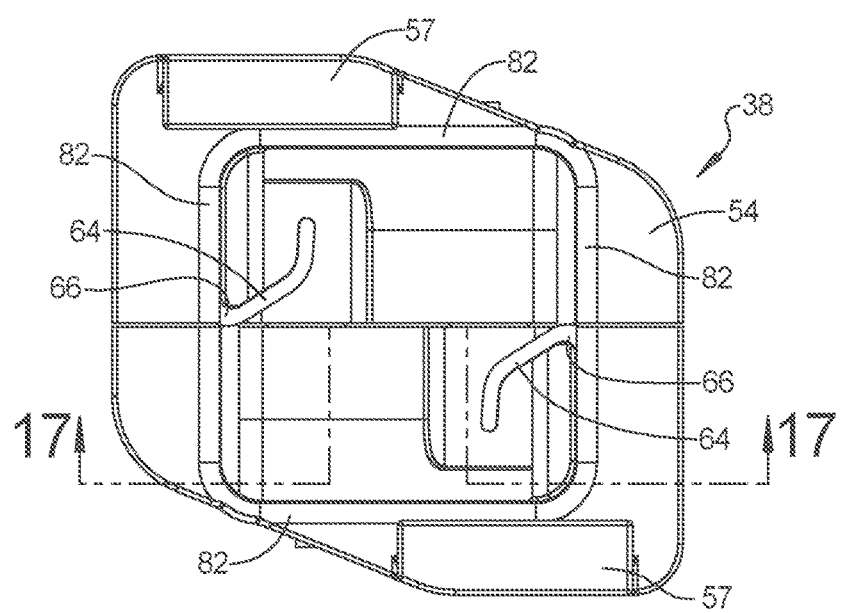
FIG. 16 is a top plan view of the outer housing of the third example pin and grommet fastener of FIG. 14.

As the pin 24 is offset from the pin retaining receptacle 40 in the Y-direction, it engages against one of the angled entry ramps 42. Continued insertion of the offset pin 24 transfers a force to the inner housing 36 via the engaged entry ramp 42. This causes the inner housing 36 to engage against and move the centering blade 64 adjacent to, or on the same side as, the engaged entry ramp 42. Thus, insertion of the offset pin 24 causes the pin retaining receptacle 40 to move to the non-central position (FIG. 5).

A Y-direction dimension of the slots 52 is greater than a Y-direction dimension of the flexible post 58 to permit such sliding movement of the inner housing flange 48 relative to the outer housing flange 54 in the Y-direction. An X-dimension of the slots 52 is greater than an X-dimension of the flexible post 58 and protrusion 57 providing the cooperating inner housing retaining surface 56.

Each centering blade 64 can have a first end 66 and a second end 68. As in this example embodiment, the first end can be coupled to the outer housing flange 54 and the second end 68 can be coupled to the end wall 70 of the outer housing 38 opposite the outer housing flange 54. As in this example embodiment, the centering blades 64 can extend generally axially within the interior 62 of the outer housing 38 between an upper portion of the outer housing 38 toward the flange 54 and a lower portion of the outer housing 38 toward the end wall 70.

FIGS. 7-13 illustrate another example embodiment of a pin and grommet fastener 20 in accordance with the present disclosure. The features or elements of this embodiment that are common or similar to those of the prior embodiment are not repeated in detail and identical reference numerals are used in these figures to identify such common or similar features. Similarly, some of the discussion below may be likewise applicable to common or similar features of the prior embodiment.

Unlike the prior example embodiment in which the outer housing 38 is a single-piece integral component, the outer housing 38 of this example embodiment comprises two half-components 72 coupled together with a living hinge 86. Cooperating locking surfaces 74, 76 engage and lock against each other to couple the two half-components 72 together. The cooperating locking surfaces 74 can be provided by protrusions 80 extending from extending arms 78. The cooperating locking surfaces 76 can be detents formed in a side wall 82 of the outer housing 38.

Both the first end 66 and the second end 68 of the centering blades 64 can be coupled and extend from adjacent side walls 82 of the outer housing 38. Thus, the centering blades 64 can extend generally laterally within the interior 62 of the outer housing 38 between a right side of the outer housing and a left side of the outer housing 38.

The inner housing retaining surface 50 can be provided by a peripheral portion 52 of an edge of the inner housing flange 48. Each cooperating inner housing retaining surface 56 can be provided by a protrusion 57 extending from a non-flexible post 58. The non-flexible posts 58 and protrusions 57 can provide slots or channels 84 open toward or opposing each other and extending longitudinally in the Y-direction. When the non-flexible posts 88 and protrusions 57 provide the inner housing retaining surface 50 adjacent the cooperating inner housing retaining surface 56, the inner housing 36 and the outer housing 38 are slidably coupled together to permit relative movement therebetween in the Y-direction. During such movement, the inner housing flange 48 and outer housing flange 54 are slidable against each other.

Due to the rigid or non-flexible nature of the post 58 and protrusion 57 and the inner housing 36 extending into the interior 62 of the outer housing 38, the opposite peripheral portions 52 of the inner housing 36 can be captured within the opposing slots 84 as the two half-components 72 are brought together and coupled together.

In this example embodiment, the two half-components 72 can be molded together with a living hinge 86 therebetween. Thus, the two half-components 72 can have a hinged clamshell configuration. For example, the hinge 86 can couple the portions of the end wall 70 together. The pivot axis of the hinge 86 can extend parallel to the longitudinal direction of the opposing slots 84. As the two half-components 72 of the outer housing 38 are pivoted toward each other about the hinge 86 and coupled together via the cooperating locking surfaces 74, 76, the inner housing 36 is positioned so that the opposite peripheral portions 52 of the inner housing flange 48 are received and captured in the opposing slots 84 of the flange 54 of the outer housing 38.

FIGS. 14-19 illustrate yet another example embodiment of a pin and grommet fastener 20 in accordance with the present disclosure. As above, features or elements of this embodiment that are common or similar to those of the prior embodiment are not repeated in detail and identical reference numerals are used in these figures to identify such common or similar features. Similarly, some of the discussion below may be likewise applicable to common or similar features of one or both of the prior embodiments.

As with the immediately prior embodiment, the outer housing 38 of this embodiment is formed of two half-components 72. Rather than a hinge coupling the portions of the end wall 70 together, this example embodiment has additional cooperating locking surfaces 74, 76 to couple the portions of the end wall 70 together.

In this example embodiment, the first end 66 of each centering blade 64 is coupled to a side wall 82 of the outer housing 38, while the second end 68 of each centering blade 64 is an uncoupled free end. Alternatively, the first end 66 of one or both of the centering blades 64 can be coupled to any combination of the end wall 70, the outer housing flange 54, or one of the side walls 82, while the second end 68 remains an uncoupled free end.

Figure 17:
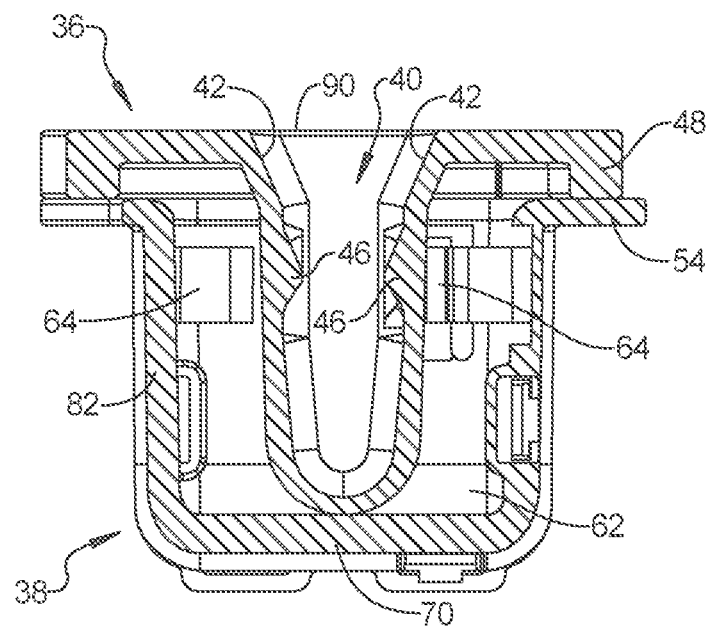
FIG. 17 is a cross-section view of the grommet of the third example pin and grommet fastener of FIG. 14, showing the inner housing in a central position.

As with the prior embodiments, the centering blades 64 extend within the interior 62 between the inner housing 36 and outer housing 38 to initially position the pin retention receptacle 40 of the inner housing in a central Y-direction position relative to the interior 62 of the outer housing 38 (FIG. 17).

Initially retaining the pin retention receptacle 40 in this central Y-direction position (FIGS. 4, 11 and 17) provides initial certainty as to where outer opening 90 of the pin retention receptacle 40 is in the Y-direction. This enables reduced overall package size of the grommet 22 and facilitates insertion of the pin 24 into the grommet 22. For example, if the inner housing 36 was initially permitted to float or slide freely relative to the outer housing 38, the inner housing 36 could be initially positioned against a far right side wall 82 of the outer housing 38. Thus, in order to insure capture of a pin 24 inserted at a far left side of the outer opening 90 of the pin retention receptacle 40, this outer opening 90 would need to be much larger in the Y-direction. Because the acceptable angle of the entry ramps 42 is limited, this means the entry ramps 42 would need to be longer resulting in increased overall axial length of the pin retention receptacle 40, and therefore, in increased overall axial length of the grommet 22 and of pin 24.

In contrast, the smaller sized outer opening 90 of the pin retention receptacle 40 is possible when the centering blades 64 position the pin retention receptacle 40 in a central Y-direction position relative to the outer housing 38. For example, in cases where multiple pin and grommet fasters 20 are used to join the first component 28 and the second component 30 together, the tolerances typically involve plus and minus dimensions from an ideal position or location. When in the central position, the outer opening 90 need only be large enough to accommodate the plus/minus tolerance dimensions. Similarly, in cases where a blind coupling of the pin 24 and grommet 22 together occurs, the repeatable relative central positioning of the pin retention receptacle 40 provides a known position of the outer opening 90 that a user or machine can rely upon when inserting the pin 24 into the grommet 22. Of course, the outer opening 90 is always maintained in a central X-direction position with the elongate pin retention receptacle 40 accommodating for tolerances or positional offsets in the X-direction.

Figure 18:
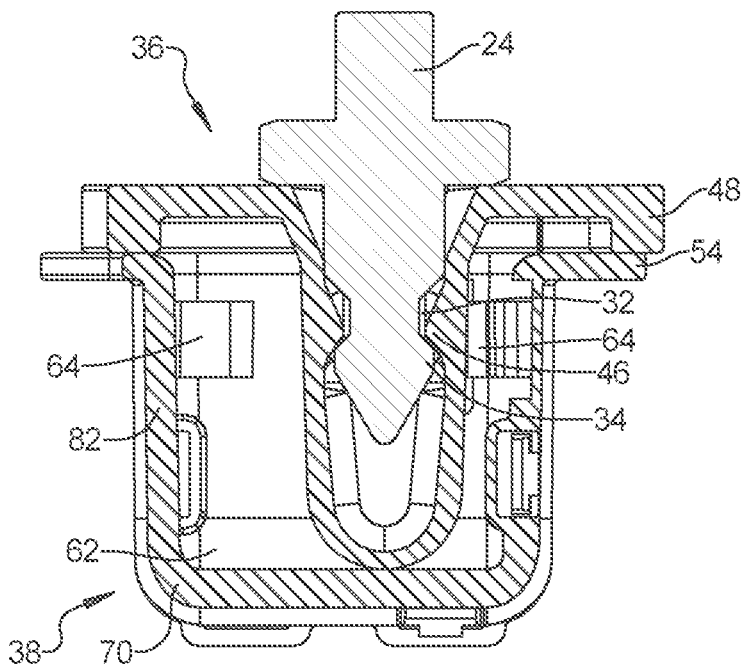
FIG. 18 is a cross-section view of the grommet of the third example pin and grommet fastener of FIG. 14, showing the inner housing in a non-central position.
Figure 19:
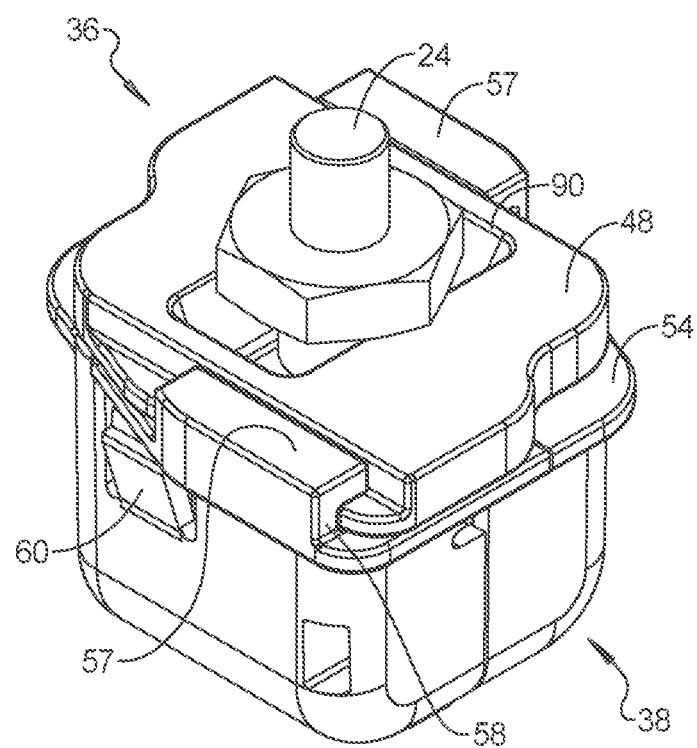
FIG. 19 is a perspective view of the third example pin and grommet fastener of FIG. 14.
Figure 20:
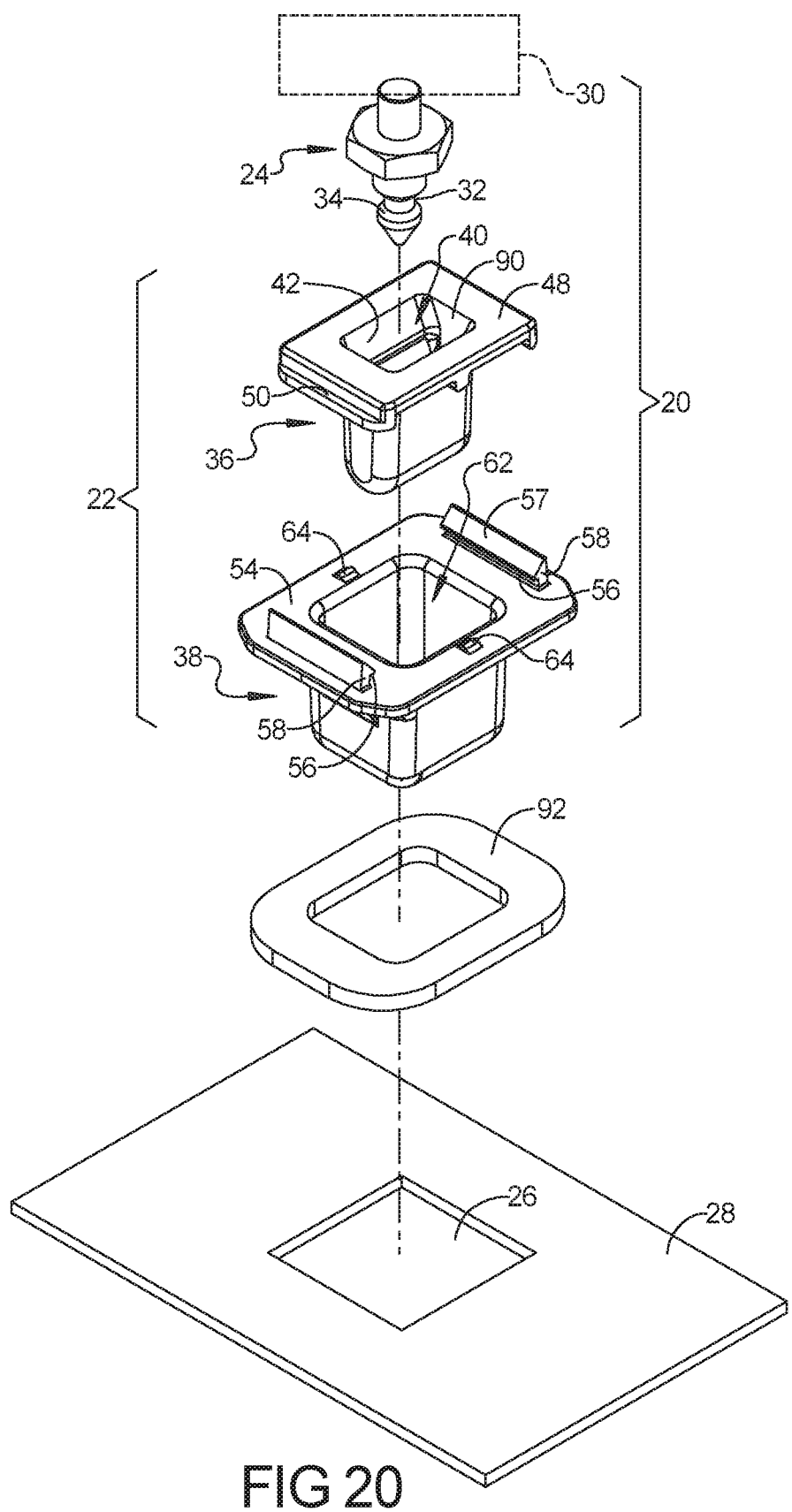
FIG. 20 is a partially exploded perspective view including a fourth example embodiment of a pin and grommet fastener, in accordance with the present disclosure.
Figure 21:
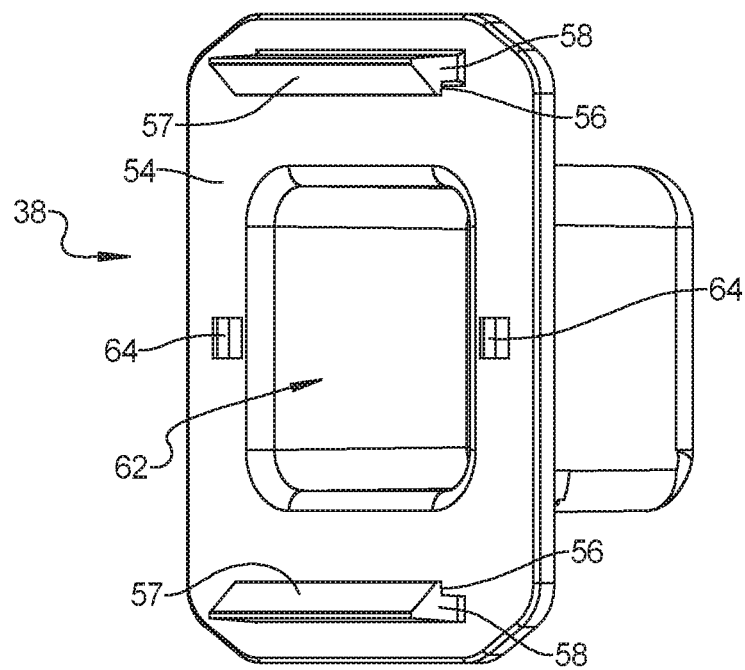
FIG. 21 is a perspective view of the outer housing of the fourth example pin and grommet fastener of FIG. 20.
Figure 22:
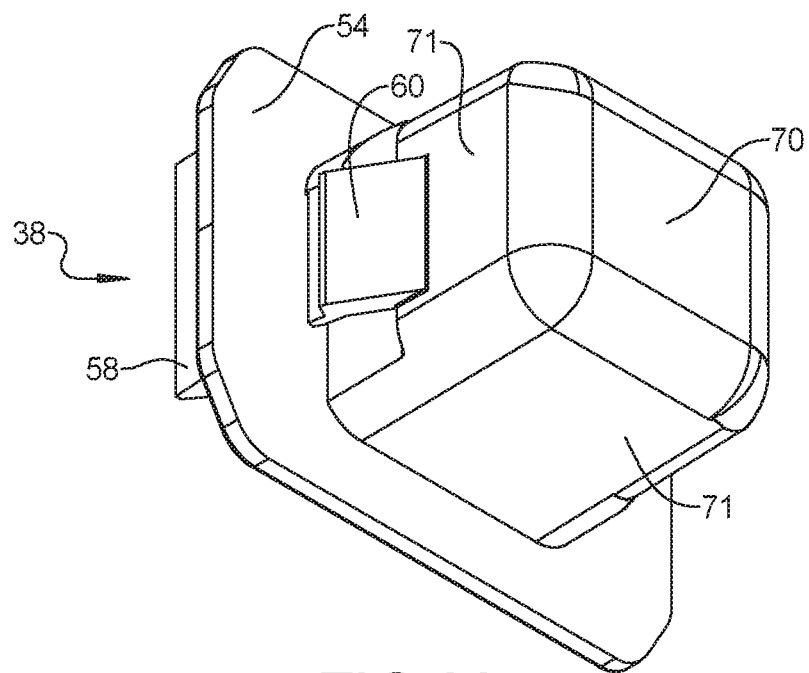
FIG. 22 is another perspective view of the outer housing of the fourth example pin and grommet fastener of FIG. 20.

Returning to the example embodiment of FIGS. 14-19, the centering blades 64 are frangible. A pin 24 offset in the Y-direction engages against the entry ramps 42 as it is inserted into the pin retention receptacle 40 causing the inner housing to move to the non-central position (FIG. 18) relative to the interior 62 of the outer housing 38. As the inner housing 36 moves to this non-central position, the frangible centering blades 64 move and can ultimately bend or break (FIG. 18). The frangible centering blades 64 can be made of a brittle material, enabling them to break. Additionally or alternatively, the frangible centering blades 64 can have a weakened area enabling them to bend or break.

FIGS. 20-25 illustrate yet another example embodiment of a pin and grommet fastener 20 in accordance with the present disclosure. As above, features or elements of this embodiment that are common or similar to those of the prior embodiment are not repeated in detail and identical reference numerals are used in these figures to identify such common or similar features. Similarly, some of the discussion below may be likewise applicable to common or similar features of one or both of the prior embodiments.

Similar to the prior embodiments, the outer housing 38 includes a plurality of resilient retention wings 60 that can be positioned to retain the pin and grommet fastener 20 within the aperture 26 of the first component 28. In this embodiment, the side walls 71 around the interior 62 of the outer housing 38 from which these resilient retention wings 60 extend, however, do not have any openings therethrough associated with the resilient retention wings 60. There are also no openings through the side walls 71 or end wall 70 surrounding and enclosing the interior 62 of the outer housing 38 associated with the centering protrusions 64. As a result, the interior 62 of the outer housing, which is below the flange 54, is fully enclosed by the surrounding side walls 71 and end wall 70.

An annular seal 92 can be provided to further resist moisture from passing through the aperture 26 of the first component 28 when the outer housing 38 is installed therein. For example, the resilient retention wings 60 can be positioned to sandwich the annular seal 92 between the outer housing flange 54 and the first component 28 while retaining the pin and grommet fastener 20 within the aperture 26 of the first component 28. Thus, the fully enclosed interior 62 prevents moisture from passing through the aperture 26 via the interior 62 which, in combination with the seal 92, helps prevent moisture from passing through the aperture 26 of the first component 28 when the outer housing 38 is installed therein.

The inner housing flange 48 can have a pair of inner housing retaining surfaces 50 that can be provided by opposite peripheral edges of the inner housing flange 48, similar to the embodiments of FIGS. 7-19. The outer housing flange 54 can have a pair of cooperating inner housing retaining surfaces 56 that can be provided by a protrusion 57 extending from a post 58 that can be flexible, similar to the embodiment of FIGS. 1-6.

Similar to the prior embodiments, this embodiment can include a pair of centering protrusions 64, which operate to initially retain the pin retaining receptacle 40 of the inner housing 36 in a central position within the interior 62 of the outer housing 38 in the Y-direction prior to insertion of the pin 24 into the pin retaining receptacle 40. In the prior embodiments, however, the centering protrusions 64 are centering blades 64 that are movable relative to the inner housing 36 or the outer housing 38 of which it is a part. In this embodiment, the centering protrusions 64 can be non-movable relative to the outer housing 38 of which the centering protrusion 64 is a part. Alternatively, the centering protrusion 64 can be part of the inner housing 36 and can be non-movable relative to inner housing 36.

As in this embodiment, the centering protrusions 64 can be provided on or by the outer housing flange 54. For example, the centering protrusions 64 can extend upwardly from opposite sides of the outer housing flange 54 to engage a cooperating pair of centering surfaces 94, respectively, of the inner housing flange 48 to initially retain the pin retaining receptacle 40 of the inner housing 36 in the central position within the interior 62 of the outer housing 38. The cooperating pair of centering surfaces 94 can be on opposite sides, respectively, of the inner housing flange 48. For example, the cooperating pair of centering surfaces 94 can be provided by opposite sides or peripheral edges of the inner housing flange 48. In other examples, a single or multiple centering protrusions 64 of the inner housing 36 or outer housing 38 can fit into a corresponding single or multiple centering recesses (not shown) of the other of the inner housing 36 or outer housing 38, with the corresponding centering recess(es) providing the cooperating centering surface(s) 94.

Figure 23:
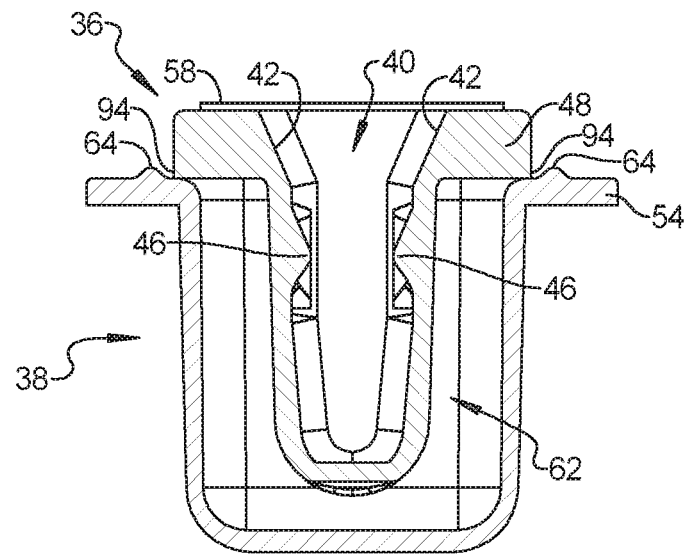
FIG. 23 is a cross-section view of the grommet of the fourth example pin and grommet fastener of FIG. 20, showing the inner housing in a central position.

As shown in FIG. 23, the centering protrusions 64 can engage the respective cooperating centering surfaces 94 to initially retain the pin retaining receptacle 40 of the inner housing 36 in a central position within the interior 62 of the outer housing 38 in the Y-direction prior to insertion of the pin 24 into the pin retaining receptacle 40.

Figure 24:
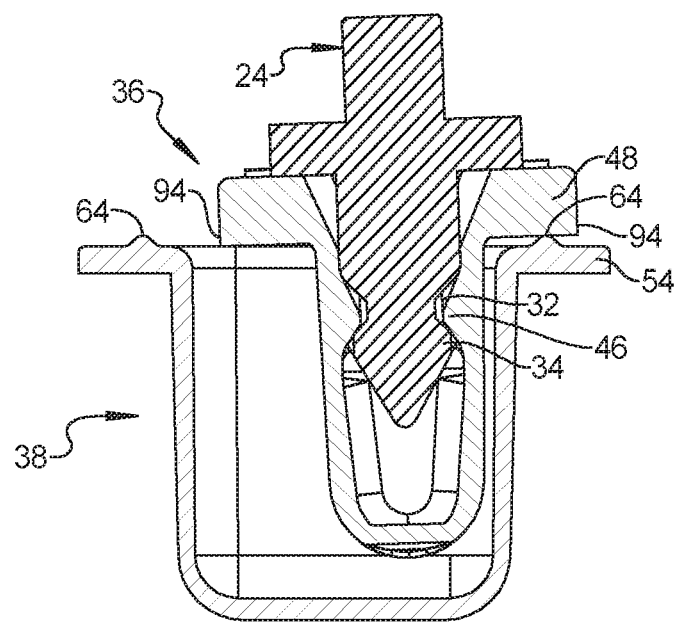
FIG. 24 is a cross-section view of the grommet of the fourth example pin and grommet fastener of FIG. 20, showing the inner housing in a non-central position.
Figure 25:
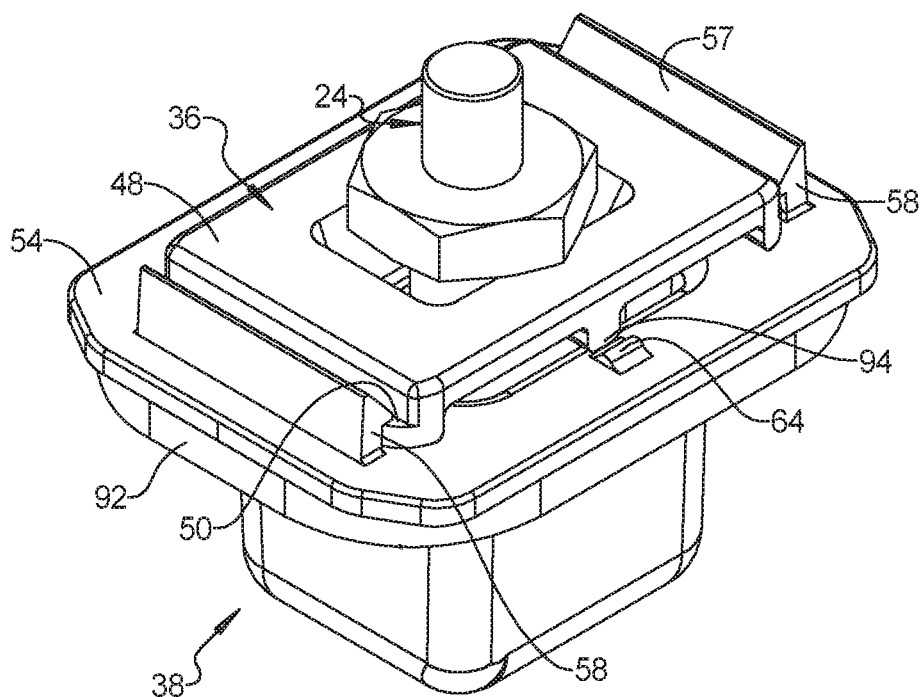
FIG. 25 is a perspective view of the fourth example pin and grommet fastener of FIG. 20.

As shown in FIG. 24, the respective cooperating centering surfaces 94 are able to move against and away from the centering protrusions 64 to permit the pin retaining receptacle 40 of the inner housing 36 to move out of the central position to the non-central position relative to the interior 62 of the outer housing 38 in the Y-direction in response to engagement of the pin 24 against the entry ramps 42 during insertion of the pin 24 into the pin retaining receptacle 40. Thus, the engagement between the centering protrusions 64 and the respective cooperating centering surfaces 94 is specifically designed to provide sufficient resistance to Y-direction sliding movement between the inner and outer housings 36, 38 when coupled together to initially retain the pin retaining receptacle 40 in a central position, but insufficient resistance to prevent such Y-direction sliding movement out of the central position or into a non-central position.

Associated methods should be apparent from the discussion above. For example, methods of manufacturing the pin and grommet fastener 20 can include molding a pin 24 and grommet 22 having any of the features or elements disclosed above, and assembling them together as described, including inserting the pin into the grommet. Methods of use or assembling first and second components, 28 and 30, respectively, together can include any of inserting the grommet 22 into the aperture 26 of the first component 28 and inserting a pin 24, coupled to the second component 30, into the pin retaining receptacle 40. All associated methods can include inserting a pin offset in the X-direction and in the Y-direction into the pin retaining receptacle 40 to cause the inner housing 36 to move in the Y-direction relative to the outer housing 38 as discussed above.

Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. Terms such as "first," "second," and other numerical terms when used herein do not imply a sequence or relative importance unless clearly indicated by the context. Similarly, the reference to "half-component(s)" does not require that each half-component represent a half of outer housing. Rather, "half-component" is used herein to convey that the outer housing is formed from two separate major components that are coupled together. Separately, references to the "X-direction" and the "Y-direction" herein relate to a two dimensional coordinate system in a plane aligned with the flanges of the grommet. Terms such as "upwardly" and "below" are used with reference to the components as oriented in FIGS. 4, 5, 11, 12, 17, 18, 23, and 24. As used herein, "generally axially" means extending within the interior generally between top to bottom portions of the housing (e.g., generally perpendicular to a plane defined by the outer housing flange), and "generally laterally" means extending within the interior generally between two side portions (e.g., generally parallel to a plane defined by the outer housing flange).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A pin and grommet fastener for mounting in an aperture of a first component and receiving a pin extending from a second component to couple the first and second components together comprising:
    a pin including a pin retention groove or protrusion;
    a grommet comprising:
        an inner housing defining a pin retaining receptacle elongated in an X-direction with entry ramps extending parallel to the X-direction, a cooperating pin retention groove or protrusion operable to retain the pin retention groove or protrusion, and an inner housing flange having an inner housing retaining surface;
        an outer housing defining an interior with an outer housing flange having a cooperating inner housing retaining surface, and a plurality of resilient retention wings positioned to retain the first component with the outer housing flange when the outer housing is mounted within the aperture of the first component;
        a centering protrusion provided on a first of the inner housing flange and the outer housing flange;
        wherein the inner housing retaining surface engages the cooperating inner housing retaining surface, with the pin retaining receptacle of the inner housing extending into the interior of the outer housing, to slidably couple the inner housing and the outer housing together while permitting movement of the inner housing relative to the outer housing in a Y-direction between a central position and a non-central position;
        wherein the centering protrusion engages a second of the inner housing flange and the outer housing flange to initially retain the pin retaining receptacle of the inner housing in the central position within the interior of the outer housing in the Y-direction prior to insertion of the pin into the pin retaining receptacle; and
        wherein the second of the inner housing flange and the outer housing flange is movable against the centering protrusion in the Y-direction to permit the pin retaining receptacle of the inner housing to move out of the central position to the non-central position relative to the interior of the outer housing in the Y-direction in response to engagement of the pin against the entry ramps during insertion of the pin into the pin retaining receptacle.

2. The pin and grommet fastener of claim 1, wherein the centering protrusion engages a cooperating centering surface of the second of the inner housing flange and the outer housing flange to initially retain the pin retaining receptacle of the inner housing in the central position.

3. The pin and grommet fastener of claim 2, wherein the centering protrusion is spaced away from the cooperating centering surface in the non-central position.

4. The pin and grommet fastener of claim 1, wherein the centering protrusion comprises a pair of centering protrusions.

5. The pin and grommet fastener of claim 4, wherein the pair of centering protrusions engage a cooperating pair of centering surfaces, respectively, of the second of the inner housing flange and the outer housing flange to initially retain the pin retaining receptacle of the inner housing in the central position.

6. The pin and grommet fastener of claim 5, wherein the pair of centering protrusions are spaced away from the cooperating pair of centering surfaces, respectively, in the non-central position.

7. The pin and grommet fastener of claim 1, wherein the first of the inner housing flange and the outer housing flange is the outer housing flange, and the second of the inner housing flange and the outer housing flange is the inner housing flange, and the centering protrusion extends upwardly from the outer housing flange to engage a cooperating centering surface of the inner housing flange to initially retain the pin retaining receptacle of the inner housing in the central position.

8. The pin and grommet fastener of claim 7, wherein the centering protrusion is spaced away from the cooperating centering surface of the inner housing flange in the non-central position.

9. The pin and grommet fastener of claim 1, wherein the first of the inner housing flange and the outer housing flange is the outer housing flange, and the second of the inner housing flange and the outer housing flange is the inner housing flange, and the centering protrusion comprises a pair of centering protrusions that each extends upwardly from the outer housing flange to engage a cooperating pair of centering surfaces, respectively, on opposite sides of the inner housing flange to initially retain the pin retaining receptacle of the inner housing in the central position.

10. The pin and grommet fastener of claim 1, wherein the centering protrusion is non-movable relative to the first of the inner housing flange and the outer housing flange.

11. The pin and grommet fastener of claim 1, wherein the centering protrusion is a centering blade that is movable relative to the inner housing and the outer housing.

12. The pin and grommet fastener of claim 1, wherein walls fully enclose the interior of the outer housing below the outer housing flange and a seal is positioned to be sandwiched between the outer housing flange and the first component when the outer housing is mounted within the aperture of the first component.

13. A pin and grommet fastener for mounting in an aperture of a first component and receiving a pin extending from a second component to couple the first and second components together comprising:
   a pin including a pin retention groove or protrusion;
   a grommet comprising:
      an inner housing defining a pin retaining receptacle elongated in an X-direction with entry ramps extending parallel to the X-direction, a cooperating pin retention groove or protrusion operable to retain the pin retention groove or protrusion, and an inner housing flange having an inner housing retaining surface;
      an outer housing defining an interior with an outer housing flange having a cooperating inner housing retaining surface, and a plurality of resilient retention wings positioned to retain the first component with the outer housing flange when the outer housing is mounted within the aperture of the first component;
      a centering protrusion provided on a first of the inner housing and the outer housing;
   wherein the inner housing retaining surface engages the cooperating inner housing retaining surface, with the pin retaining receptacle of the inner housing extending into the interior of the outer housing, to slidably couple the inner housing and the outer housing together while permitting movement of the inner housing relative to the outer housing in a Y-direction between a central position and a non-central position;
   wherein the centering protrusion engages a second of the inner housing and the outer housing to initially retain the pin retaining receptacle of the inner housing in the central position within the interior of the outer housing in the Y-direction prior to insertion of the pin into the pin retaining receptacle; and
   wherein the second of the inner housing and the outer housing is movable against the centering protrusion in the Y-direction to permit the pin retaining receptacle of the inner housing to move out of the central position to the non-central position relative to the interior of the outer housing in the Y-direction in response to engagement of the pin against the entry ramps during insertion of the pin into the pin retaining receptacle.

14. The pin and grommet fastener of claim 13, wherein the centering protrusion comprises a pair of centering protrusions.

15. The pin and grommet fastener of claim 13, wherein the cooperating inner housing retaining surface is provided by a protrusion extending from a post of the outer housing flange.

16. The pin and grommet fastener of claim 15, wherein the post is flexible.

17. The pin and grommet fastener of claim 15, wherein the post is non-flexible.

18. The pin and grommet fastener of claim 13, wherein the inner housing retaining surface comprises a pair of inner housing retaining surfaces, and the cooperating inner housing retaining surface comprises a pair of cooperating inner housing retaining surfaces.

19. The pin and grommet fastener of claim 18, wherein the outer housing and the inner housing are each a single-piece integral component, each of the pair of inner housing retaining surfaces is provided by a peripheral portion of the inner housing flange, and each of the pair of cooperating inner housing retaining surfaces is provided by a protrusion extending from a flexible post of the outer housing flange.

20. The pin and grommet fastener of claim 18, wherein the outer housing comprises two half-components with cooperating locking surfaces coupling the two half-components together and each of the pair of inner housing retaining surfaces is provided by a peripheral portion of the inner housing flange, and each of the pair of cooperating inner housing retaining surfaces is provided by a protrusion extending from a non-flexible post of the outer housing flange.

* * * * *